US010310720B2

(12) United States Patent
Hodges et al.

(10) Patent No.: US 10,310,720 B2
(45) Date of Patent: *Jun. 4, 2019

(54) IMPLEMENTATION ORDER OF IMAGE EDITS

(71) Applicant: Visual Supply Company, Oakland, CA (US)

(72) Inventors: Zachary Daniel Hodges, Orinda, CA (US); Robert A. Newport, Oakland, CA (US)

(73) Assignee: Visual Supply Company, Oakland, CA (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/295,451

(22) Filed: Oct. 17, 2016

(65) Prior Publication Data

US 2017/0031572 A1  Feb. 2, 2017

Related U.S. Application Data

(63) Continuation of application No. 14/834,001, filed on Aug. 24, 2015, now Pat. No. 9,472,010, which is a
(Continued)

(51) Int. Cl.
G06F 16/50 (2019.01)
G06T 11/60 (2006.01)
(Continued)

(52) U.S. Cl.
CPC .......... G06F 3/04845 (2013.01); G06F 16/50 (2019.01); G06F 16/51 (2019.01);
(Continued)

(58) Field of Classification Search
CPC ..... G06T 11/60; H04L 69/22; G06F 3/04845; G06F 17/30244; G06F 17/3028
See application file for complete search history.

(56) References Cited

U.S. PATENT DOCUMENTS 5,568,275 A   10/1996 Norton et al.
6,016,380 A    1/2000 Norton
(Continued)

OTHER PUBLICATIONS

"U.S. Appl. No. 14/555,135, Non Final Office Action dated Feb. 4, 2015", 14 pgs.
(Continued)

Primary Examiner — Utpal D Shah
(74) Attorney, Agent, or Firm — Schwegman Lundberg & Woessner, P.A.

(57) ABSTRACT

Systems and methods for editing an image file include a server and at least one client device of the server including a display. An imaging module accesses from the server an image file including image content and a header, wherein the header provides information regarding the image file. An editing module receives user edits to the image content and insert information regarding the user edits into the header. The imaging module applies the user edits in an order that is determined based on a weight assigned to each user edit. The imaging module may also access, from the server, an image file including image content and a header thereof, wherein the header provides information regarding the image file and an edit decision list reflecting historical user edits to the image content. The editing module then identifies the edit decision list in the header for application by the imaging module.

17 Claims, 7 Drawing Sheets

Related U.S. Application Data continuation of application No. 14/555,135, filed on Nov. 26, 2014, now Pat. No. 9,146,942.

(51) Int. Cl.
*G06F 3/0484* (2013.01)
*G06F 16/51* (2019.01)
*H04L 29/06* (2006.01)

(52) U.S. Cl.
CPC .............. *G06T 11/60* (2013.01); *H04L 69/22* (2013.01); *G06T 2200/24* (2013.01)

(56) References Cited

U.S. PATENT DOCUMENTS

| | | |
|---|---|---|
| 6,961,139 B1 | 11/2005 | Kita et al. |
| 7,315,386 B1 | 1/2008 | Shiimori et al. |
| 7,992,165 B1 | 8/2011 | Ludewig et al. |
| 9,146,942 B1 | 9/2015 | Hodges et al. |
| 9,472,010 B2 | 10/2016 | Hodges et al. |
| 2002/0033842 A1 | 3/2002 | Zetts |
| 2003/0026592 A1 | 2/2003 | Kawahara et al. |
| 2003/0233379 A1 | 12/2003 | Cohen et al. |
| 2005/0160065 A1 | 7/2005 | Seeman |
| 2005/0213935 A1 | 9/2005 | Shibata et al. |
| 2006/0224448 A1 | 10/2006 | Herf |
| 2007/0050336 A1 | 3/2007 | Bugir et al. |
| 2007/0297018 A1* | 12/2007 | Bangham ............... G06T 11/60 358/452 |
| 2008/0170806 A1* | 7/2008 | Kim ..................... H04N 19/597 382/285 |
| 2008/0285892 A1 | 11/2008 | Sposato et al. |
| 2009/0208119 A1 | 8/2009 | Lee et al. |
| 2009/0210460 A1 | 8/2009 | Ollivier et al. |
| 2010/0118115 A1 | 5/2010 | Takahashi et al. |
| 2010/0315517 A1 | 12/2010 | Nakamura et al. |
| 2011/0030031 A1 | 2/2011 | Lussier et al. |
| 2011/0075200 A1 | 3/2011 | Goldwater et al. |
| 2011/0085047 A1 | 4/2011 | Yoo |
| 2012/0218275 A1 | 8/2012 | Wu |
| 2013/0132843 A1 | 5/2013 | Marnett |
| 2014/0350966 A1 | 11/2014 | Khatana et al. |
| 2016/0148407 A1 | 5/2016 | Hodges et al. |

OTHER PUBLICATIONS

"U.S. Appl. No. 14/555,135, Notice of Allowance dated May 27, 2015", 8 pgs.
"U.S. Appl. No. 14/555,135, Response filed May 4, 2015 to Non Final Office Action dated Feb. 4, 2015", 9 pgs.
"U.S. Appl. No. 14/834,001, Non Final Office Action dated Feb. 26, 2016", 9 pgs.
"U.S. Appl. No. 14/834,001, Notice of Allowance dated Jun. 20, 2016", 7 pgs.
"U.S. Appl. No. 14/834,001, Response filed May 26, 2016 to Non Final Office Action dated Feb. 26, 2016", 10 pgs.

* cited by examiner

IMPLEMENTATION ORDER OF IMAGE EDITS

RELATED APPLICATIONS

This application is a continuation of U.S. patent application Ser. No. 14/834,001, filed Aug. 24, 2015, which is a continuation of U.S. patent application Ser. No. 14/555,135, filed Nov. 26, 2014, which are incorporated herein by reference in their entireties.

TECHNICAL FIELD

The present application relates generally to systems and methods for editing image files and more specifically to systems and methods for inserting information regarding user edits to an image file in a header of the image file wherein the edits may then be applied to the image in an order that is based on respective weights assigned to each of the user edits.

BACKGROUND

With the development of computer and network related technologies, many users choose to purchase and/or distribute digital image files (e.g., digital videos and digital photos) over networks. In many situations, it is desirable to facilitate and simplify the process of editing an image file so that the process is "non-destructive", e.g., it leaves the source image unchanged for ease of purchase and/or distribution of the digital image over networks.

BRIEF DESCRIPTION OF THE DRAWINGS

The present application is illustrated by way of example and not limitation in the figures of the accompanying drawings, in which like references indicate similar elements and in which.

DETAILED DESCRIPTION

Figure 1:
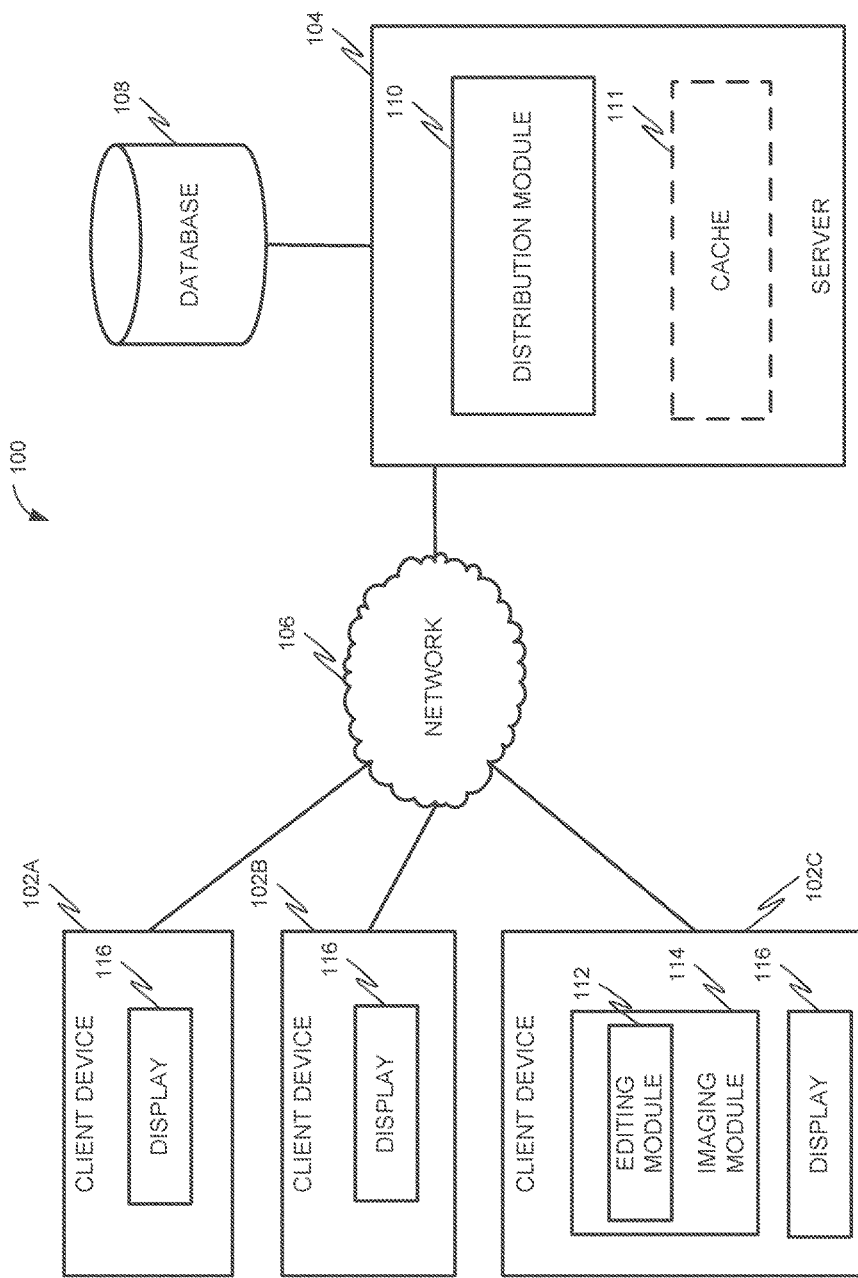
FIG. 1 is an overview diagram showing a network system configured to edit an image file and to transmit the image file over a network according to an example embodiment of the application.

A system, a machine-readable storage medium storing instructions, and a computer-implemented method are described herein to create an edit decision list of historical editing information. In the following description, for purposes of explanation, numerous specific details are set forth in order to provide a thorough understanding of example embodiments. It will be evident, however, to one skilled in the art that the present technology may be practiced without these specific details.

In various embodiments, an edit decision list is a listing of editing tools and filters selected by an end user that applied edits, modifications and changes to a source image file. A filter may adjust an overall artistic property of an image, for example by changing color to black-and-white, whereas a tool allows a user to apply utilitarian effects to correct problems with the image, like brightness, color balance, etc. When the end user is selecting edits to be applied to a source image file in a mobile device application, the end user selects the specific tools and filters he wishes to apply in order to make desired changes to the source image.

Each filter and tool corresponds to a respective, predetermined priority rating (or weight). The order by which the filters and/or tools selected by the end user are applied by the mobile device application to edit the source image is determined according to their respective priority ratings as opposed to the order in which the end user selected the filters and/or tools. For example, a first priority rating indicates that a first filter should be applied by the mobile device application to a source image prior to a second filter with a second priority rating in order to produce the most ideal aesthetic results between the first and second filters—regardless of whether the end user selects the second filter prior to the first filter. Therefore, when the mobile device application generates and renders the edited source image to be viewed by the end user, the edited source image is a result of image edits performed in an order as determined by the selected filters and/or tools priority ratings and not an order in which the filter and/or tools were selected by the end user.

The mobile device application embeds the edit decision list in a header of the original (i.e. non-modified) source image file. In one embodiment, the embedded edit decision list lists the end user's selected the filters/tools according to the order in which they were selected by the end user. The end user can transmit the original source image file, with the edit decision list embedded in the header, to a target mobile device application.

The target mobile device application receives the original source image (with the embedded edit decision list). If the target mobile device application is not native to the embedded edit decision list, the target mobile device application does not access the embedded edit decision list and, therefore, the target user of the target mobile device application views the original source image.

If the target mobile device application is native to the embedded edit decision list, the target mobile device application accesses the embedded edit decision list in the header edits the received original source image according to the filter and/or tools listed in the embedded edit decision list in an order determined according to the respective priority ratings of the filter and/or tools listed in the embedded edit decision list. When the target user accesses the received image in the native target mobile device application, the native target mobile device application generates and renders the edited version of the source image.

In other embodiments, each filter/tool can have a setting (such as a scale of 1-10) that the end user can select. For example, the setting can indicate an extent (such as respective intensity levels) at which a filter/tool is to be applied—such as applying a brightness filter or a contrast filter on a scale of 1-10. The setting level selected by the end user for a filter/tool can be considered by the mobile device application in addition to the filter/tool's priority rating. For example, a first filter may have a higher priority rating than a first tool, so that the mobile device application applies the first filter before applying the first tool even if the end user selects the first tool before the first filter. However, when the end user selects the first filter set at a first setting and selects the first tool set at a second setting, the mobile device application applies the first tool to a source image before the first filter upon determining that the values of the first and second settings override the aesthetic effect of applying the first filter before the first tool as indicated by their respective priority ratings.

Network System

FIG. 1 illustrates an overview diagram showing a network system 100 configured to edit an image file and to transmit the image file over a network according to an example embodiment of the application. The network system 100 includes client devices 102A, 102B and 102C, a server 104 and a database 108, all of which are in communication with each other via a network 106. The client devices (102A, 102B and 102C) may comprise mobile devices (e.g., smart phones) including displays 116 for viewing images. The client devices (102A, 102B and 102C) may include an imaging module 114 (e.g., client device 102C) for viewing and manipulating images received via network 106 or they may not include such a module (e.g., client devices 102A and 102B). The manipulation of image files by the imaging module 114 may be performed by an editing module 112 of the imaging module 114. The server 104 may include a distribution module 110 for distributing content over network 106, for example image content stored in database 108. Furthermore, the server 104 may optionally include a cache for storing frequently accessed data from database 108, for example a very popular image file.

In some embodiments, the imaging module 114 of client device 102C may access an image file (e.g., standard image file format such as the "JPEG File Interchange Format" often used to display images on the Internet) from database 108 through the distribution module 110 of server 104. The image file may include image content and a header thereof providing information regarding the image file, for example information according to the "Exchangeable image file format" (Exit) for standardizing the exchange of images with image metadata (e.g., in a header of the image file) between digital cameras and editing and viewing software (e.g., imaging module 114). The metadata may include such things as camera settings, time and date, shutter speed, exposure, image size, compression or color information. When images including Exif information are viewed e.g., on display 116 of client device 102C) or edited by image editing software (e.g., imaging module 114 of client device 102C), all of this image metadata information can be displayed.

The imaging module 114 of client device 102C includes an editing module 112 which may be used to edit the received image file according to the selections of a user of client device 102C. The editing module 112 may then insert information regarding the user edits (e.g., an edit decision list) into the header of the image file, e.g., together with any Exif information. This may be accomplished, for example, by inserting editing information into blank spaces in the Exif data of the header of the image file or by replacing certain (e.g., unneeded) Exif data in the header of the image file.

In some embodiments, the information regarding the edits (to be inserted into a header of an image file) comprises an edit decision list of editing tools and filters of the editing module 112 as selected by a user. As noted above, a filter may be used to adjust an overall property of an image and a tool may provide an interface for the user to select a portion of the image and edit the selected portion. The imaging module 114 may display the image (e.g., on a display 116 of client device 102C) to the user editing the image by applying the user selected edits in an order that is determined based on a weight assigned to each selected editing tool and filter regardless of the order in which the edits were selected by the user. In an example, the weights assigned to each editing tool and filter are determined based on a comparison of the image quality of the displayed image content (e.g., on a display 116) with a first tool/filter applied before a second tool/filter against the image quality of the displayed image content with the second tool/filter applied before the first tool/filter.

In some embodiments, each editing tool and filter of editing module 112 can have a setting or intensity level (e.g., a scale of 1-10) that the user can select when applying a filter or tool to an image. In an example, the intensity level selected by the user for a filter/tool of editing module 112 may be used (e.g., along with the weight of the filter/tool) by imaging module 114 when determining the order for applying edits (e.g., filters and tools) to an image. For example, one filter may have a higher weight than a tool, so that the filter will be applied by imaging module 114 before applying the tool—even if the user selects the tool before the filter. However, when the filter is set at a first intensity level and the tool is set at a second intensity level, the tool will be applied by imaging module 114 before the filter since the values of the first and second intensity levels influence the order of application of the edits. This may be accomplished, for example, by changing the respective weights of the filter and tool based on the user selected intensity levels of each.

In some embodiments, each of client devices 102A, 102B and 102C may access the same image file (e.g., in an image file format such as the "JPEG File Interchange Format") from database 108 through the distribution module 110 of server 104. The image file may include image content and a header thereof providing information regarding the image file, for example information according to the "Exchangeable image file format" (Exif) for standardizing the exchange of images with image metadata (e.g., in a header of the image file) between digital cameras and editing and viewing software (e.g., imaging module 114). The header of the accessed image file may also include an edit decision list embedded in the header as described above. The editing module 112 of imaging module 114 will immediately recognize the embedded edit decision list in the accessed image file. However, because the client devices 102A and 102B do not include an imaging module 114 (or editing module 112) these client devices 102A and 102B will be unable to distinguish any edit decision list information in the header of the accessed image file from the standard Exif metadata in the header.

In some embodiments, the imaging module 114 may display the accessed image to a user by applying the historical user edits (as reflected in the edit decision list embedded in the header of the accessed image file) in an order that is determined based on the weight assigned to each selected editing tool and filter and based on the intensity of each selected editing tool and filter (also as reflected in the edit decision list embedded in the header of the image file).

File Structure

Figures 2, 3:
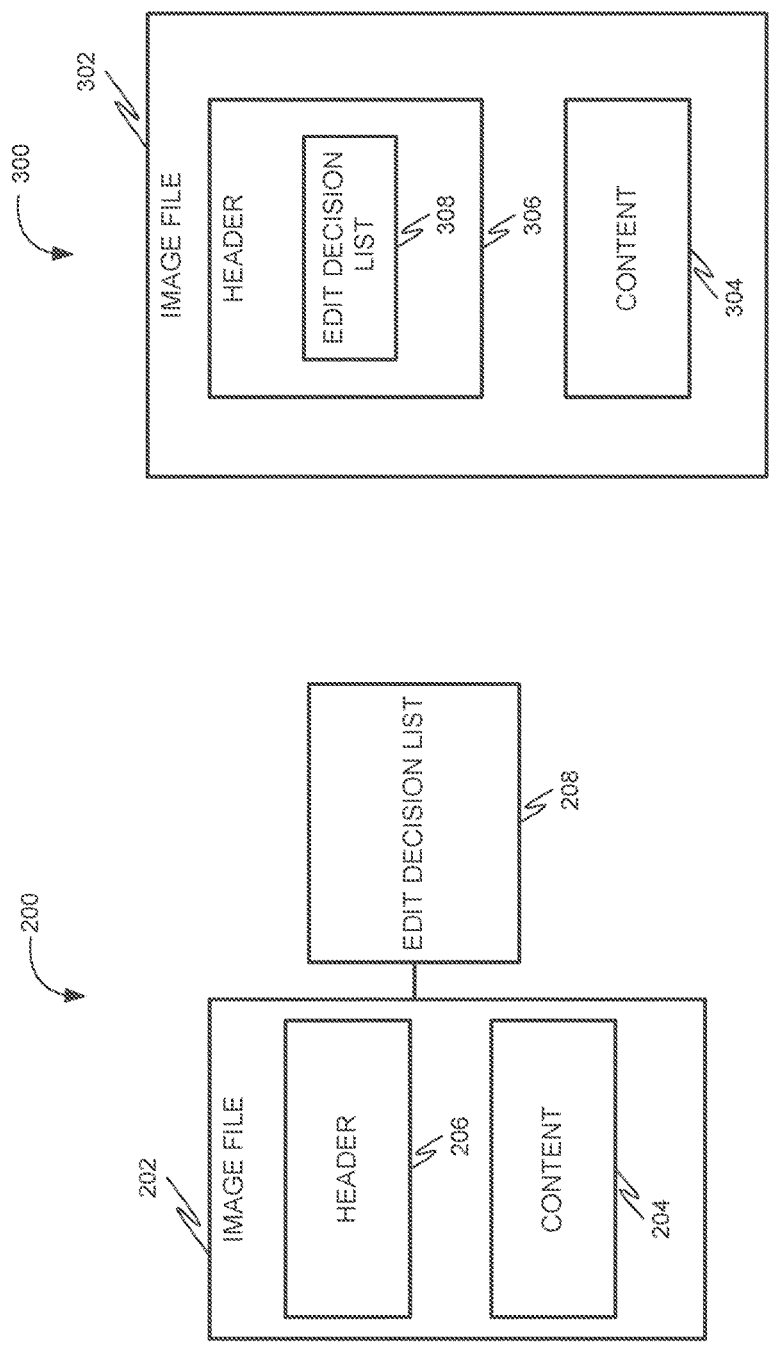
FIG. 2 is a diagram showing an edited image file together with an associated edit decision list according to the prior art.
FIG. 3 is a diagram showing an edited image file together with an associated edit decision list according to an example embodiment.

FIG. 2 shows a diagram 200 of an example image file 202 that has been edited according to any one of the common methods known in the art. As can be seen the image file 202 includes image content 204 and a header 206 including metadata of the image file 202. As noted above, the metadata stored in a header may include information associated with image file 202 regarding: camera settings, time and date, shutter speed, exposure, image size, image compression or image colors. Although the image file 202 may be a standard image file format (PNG, JPEG, and GIF formats are common formats for storing images), since it has been edited using an application which did not alter the source image file 202 it now has a separate edit decision list 208 bundled with it to provide associated editing information to any potential recipient. The edit decision list includes information regarding user selections of editing tools and filters to be applied to source image file 202. However, if the image file 202 is later opened for viewing in a different system or application from the one used to edit the image (e.g., a client device 102A, 102B or 102C), then the associated edit decision list 208 may not be recognized by the different system or application even if it does recognize the format of the source image file 202. Furthermore, an unrecognized file type (e.g., edit decision list 208) may be difficult to transmit over a network (e.g., network 106) if security measures at the receiving client device do not allow for reception of unrecognized file types.

FIG. 3 shows a diagram 300 of an example image file 302 that has been edited according to an example embodiment. As can be seen the image file 302 includes image content 304 and a header 306 including metadata of the image file 302. As noted above, the metadata stored in a header may include information associated with image file 302. Although the image file 302 is a standard image file format (PNG, JPEG, GIF, etc.) and it has been edited using a method which did not alter the source image file 302, it does not have a separate edit decision list (like edit decision list 208) bundled with it to provide associated editing information to a potential recipient of the image file 302. Instead the image file 302 has had an edit decision list 308 inserted into the header 306 for the purpose of providing the editing information. The edit decision list includes information regarding user selections of editing tools and filters to be applied to source image file 302. The edit decision list 308 may be inserted into the header 306 of the image file 302 (e.g., together with any Exif information) by, for example, inserting information from the edit list 308 into blank spaces in the image metadata (e.g., Exif data) of the header 306 of the image file 302 or by replacing certain (e.g., unneeded) metadata in the header 306 of the image file 302.

As shown in the below example header for an image file "img_1890.jpg", the empty slots for "Copyright" and "Exif comment" may be used for edit decision list data. Furthermore, information regarding the "Camera make" or regarding whether the "Macro mode" was on may be able to be discarded in favor of edit decision list data inserted into the header. For example, the comment slot could include information regarding a user selection of a filter to be applied to image file 302, e.g., "filter: grain; intensity level: 5".

Example Image Header
File name: img_1890.jpg
File size: 32780 Bytes
MIME type: image/jpeg
Image size: 480×360
Camera make: Canon
Camera model: Canon PowerShot S40
Image timestamp: 2014:10:16 11:04:23
Image number: 118-1890
Exposure time: 1/500 s
Aperture: F4.6
Exposure bias: 0 EV
Flash: No, auto
Flash bias: 0 EV
Focal length: 21.6 mm
Subject distance: 767
ISO speed: 100
Exposure mode: Program (P)
Metering mode: Center weighted average
Macro mode: On
Image quality: Superfine
Exif Resolution: 2272×1704
White balance: Manual
Thumbnail: image/jpeg, 5448 Bytes
Copyright:
Exif comment:

Data Flow

Figure 4:
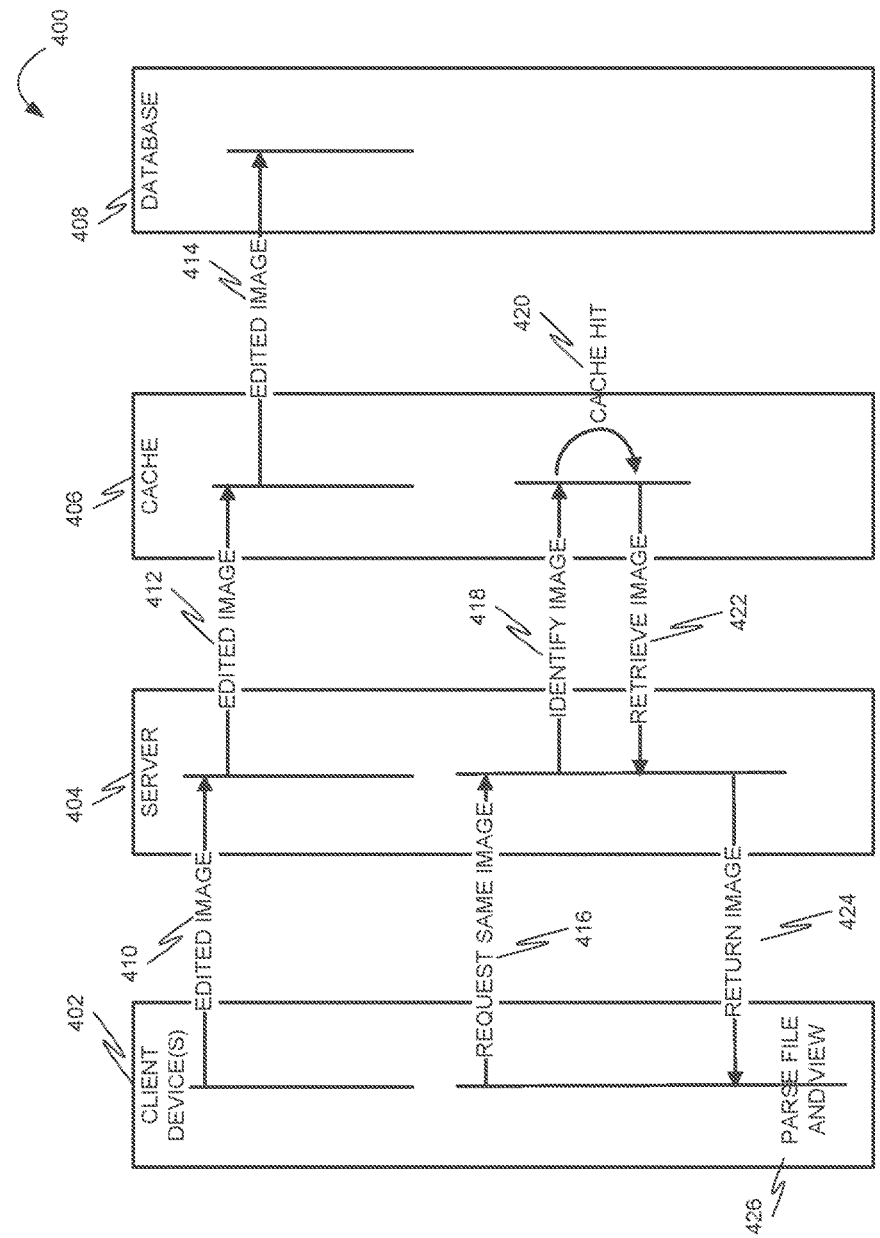
FIG. 4 is a ladder diagram illustrating a method, in accordance with an example embodiment, for editing an image file.

FIG. 4 is a ladder diagram 400 illustrating a method, in accordance with an example embodiment, for editing an image file. A client device e.g., client device 102C) of client device(s) 402 may be used to edit an image file (e.g., image file 302) including leaving the source image file untouched and inserting an edit decision list into a header of the image file. At operation 410, the edited image file is then sent to server 404 which stores the edited image file in the database 408 at operation data structure 414. The server 404 may, optionally, also store a copy of the edited image file in a cache 406 at operation 412 if it is determined that the image file may be requested frequently by connected client device(s) 402. At operation 416, another of the client device(s) 402 may request a copy of the edited image file from the server 404. At operation 418, the server 404 may identify the stored edited image file in the cache 406 (if a copy has been stored in the cache 406), for example, based on an identifier associated with the edited image file. This is referred to as a "cache hit" 420, as opposed to a "cache miss" if the requested edited image file is not identified in the cache 406. If the server 404 experiences a "cache miss" then the server 404 proceeds to identify the requested image file in the database 408.

In the example of FIG. 4, the server 404 does find a copy of the requested image file in the cache 406 (cache hit 420) and proceeds to retrieve the requested image file from the cache 406 at operation 422. At operation 424, the server 404 may return the requested image file to the requesting client device(s) 402. Finally, at operation 426, requesting client device(s) 402 may parse the received image file to identify the edit decision list embedded in the header thereof and then display the image by applying the user selected editing tools and filters to the source image file in an order that is determined according to weights (or priority ratings) that have been assigned to each of the selected editing tools and filters. The edit decision list may also include intensity level information for at least one of the user selected edits to the source image file and in that case, the order in which the edits are applied to the source image for display may also depend on the intensity level of the at least one selected editing tool or filter.

Editing Workflow

Presented below is an example order for applying user selected edits to an image file according to weights (lowest weight first) assigned to each selected editing tool/filter. In the below example, the order in which the edits were selected by the user are completely disregarded, for example, the user may have selected "Contrast" and "Cropping" first and second. However, because of their respective assigned weights (6 and 7) these will be applied $4^{th}$ and $5^{th}$ instead of first and second. The determination of the assigned weights (or priority ratings) may be based on expert opinions regarding the quality of an image that results from varying the order in which edits are applied to an image, as explained above.

| Weight | Edit |
|--------|------|
| 1 | White Balance |
| 3 | Noise Reduction |
| 4 | Vignette |
| 6 | Contrast |
| 7 | Cropping |
| 9 | Resizing |
| 10 | Output Sharpening |

Example Methods

Figure 5:
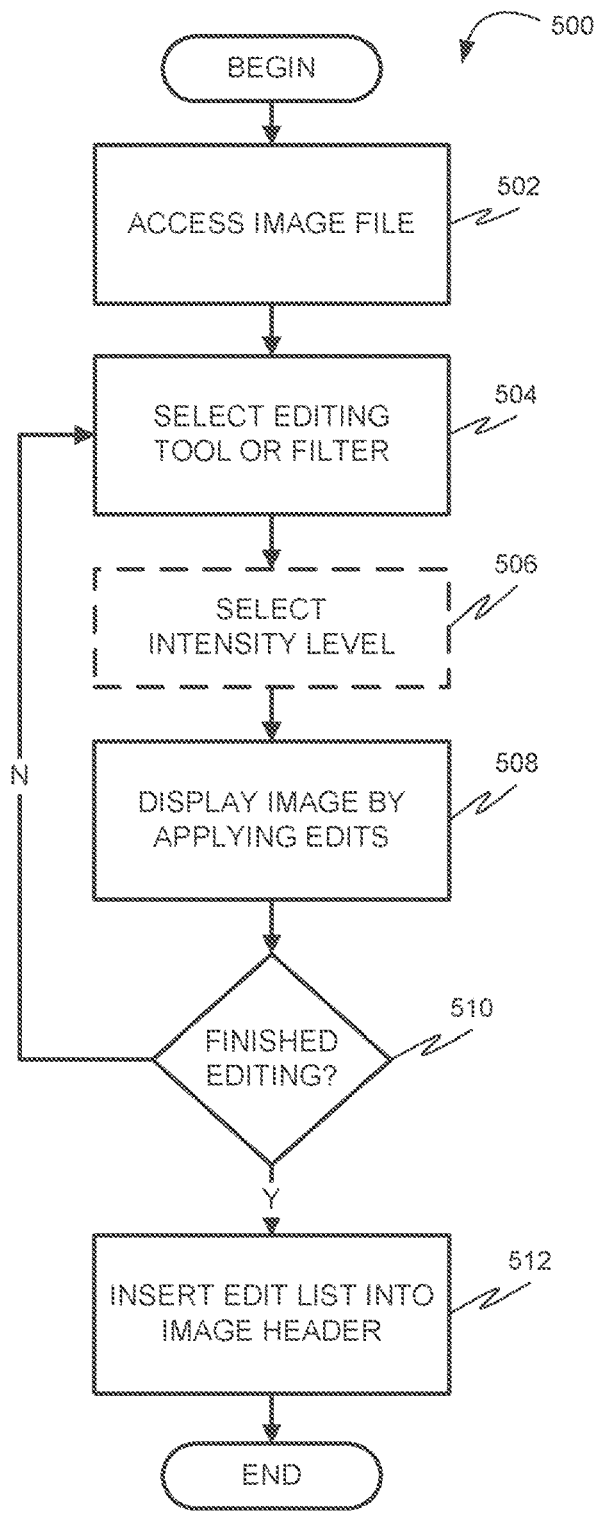
FIG. 5 is a flow diagram illustrating a method, in accordance with an example embodiment, for editing image files.

FIG. 5 illustrates a block diagram showing a buyer system 500 according to an example embodiment. At operation 502 an image file is accessed, for example, accessed from a server 104 by a client device 102C. At operation 504, a user selects a first editing tool or filter to apply to the image. At operation 506, the user may, optionally, select an intensity level for the selected editing tool or filter of operation 504. At operation 508, the image may be displayed to the user with the selected editing tool or filter applied to the image. At operation 510, if the user is finished editing the document, then the method 500 proceeds to operation 512 where an edit decision list (including information regarding the editing tools or filters chosen by the user and, optionally, any intensity level information for the selected tools or filters) is inserted into a header of the image file. In this way the source image file remains unchanged. If at operation 510, the user is not finished editing the image, then method 500 returns to operation 504 so that the user may select another editing tool or filter to apply to the image.

At operation 504, the user may then select a second editing tool or filter to apply to the image file and, optionally, proceed to operation 506 to select an intensity level for the selected imaging tool or filter of operation 504. At operation 508, the image may be displayed to the user with both of the previously selected editing tools or filters applied to the image. However, the selected editing tools or filters are not applied to the image in the order that they were selected by the user. Instead the image is displayed with the selected editing tools or filters applied in an order that is determined based on respective weights assigned to each of the selected editing tools or filters (as explained in more detail above). If the user has selected an intensity level for the first or second selected editing tools or filters then the intensity level may also be considered when deterring the order for applying the selected editing tools or filters to the image when displaying the image.

Figure 6:
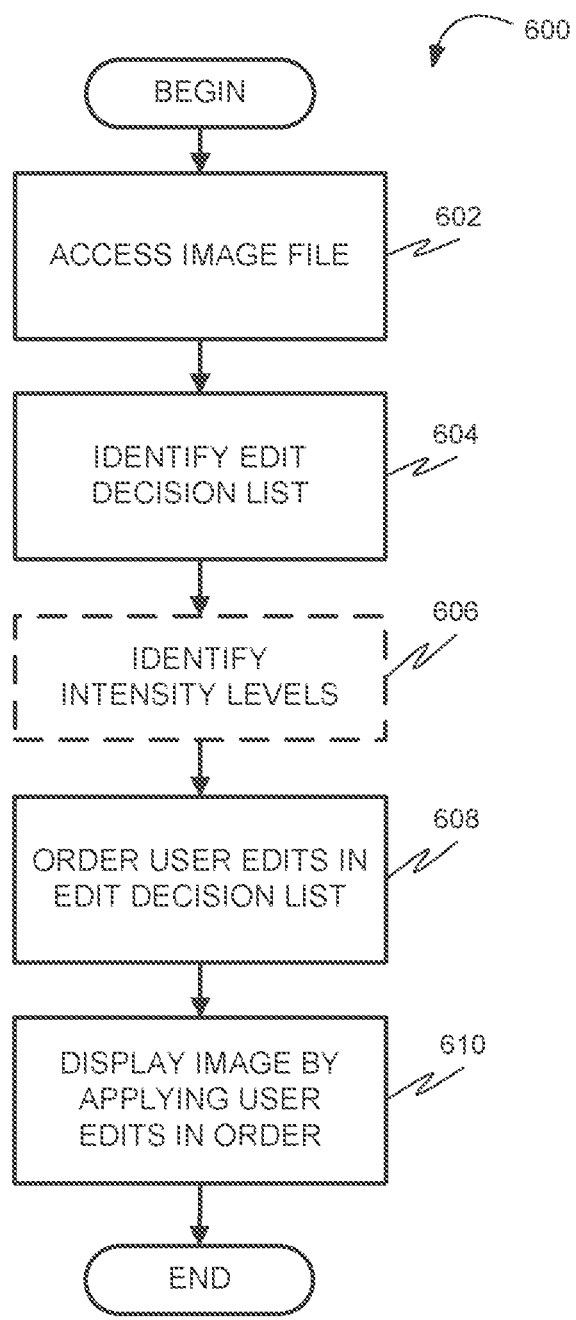
FIG. 6 is a flow diagram illustrating a method, in accordance with an example embodiment, for reading and displaying an edited image file.

FIG. 6 is a flow diagram illustrating a method, in accordance with an example embodiment, for reading and displaying an edited image file. At operation 602 an image file is accessed, for example, accessed from a server 104 by a client device 102C. At operation 604, an embedded edit decision (including historical information regarding the editing tools or filters applied to the image by a user) may be identified in a header of the accessed image file. At operation 606, embedded information regarding any intensity level information for the selected tools or filters may, optionally, be identified in the embedded edit decision list. At operation 608, the selected editing tools or filters may be ordered according to respective weights assigned to each of the selected editing tools or filters (as explained in more detail above). If the embedded edit decision list includes intensity level information regarding the selected editing tools or filters then the intensity level may also be considered when determining the ordering of the user selected editing tools or filters. At operation 610, the image may be displayed with the user selected editing tools or filters applied according to the determined ordering of the selected editing tools or filters.

Example Mobile Device

Figure 7:
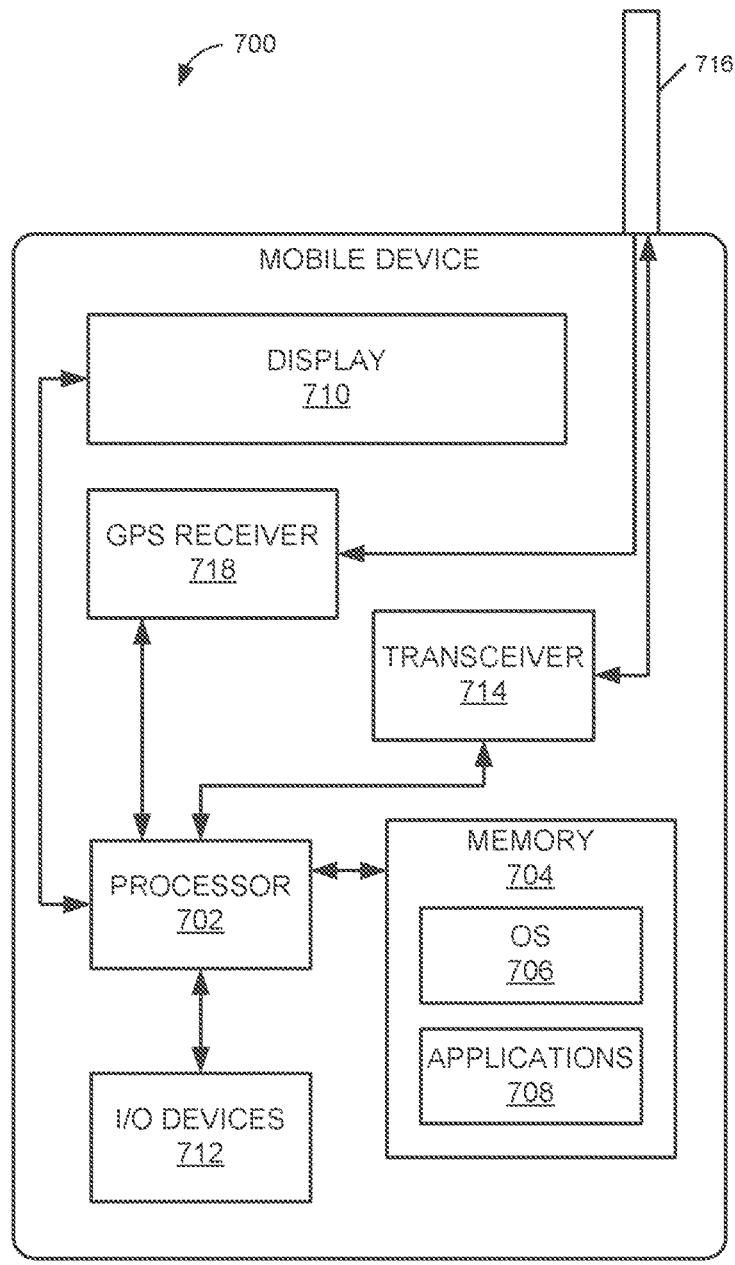
FIG. 7 is a block diagram illustrating a mobile device, according to an example embodiment.

FIG. 7 is a block diagram illustrating a mobile device 700, according to an example embodiment. The mobile device 700 can include a processor 702. The processor 702 can be any of a variety of different types of commercially available processors suitable for mobile devices (for example, an XScale architecture microprocessor, a Microprocessor without Interlocked Pipeline Stages (MIPS) architecture processor, or another type of processor). A memory 704, such as a Random Access Memory (RAM), a Flash memory, or another type of memory, can be accessible to the processor. The memory 704 can be adapted to store an operating system (OS) 706, as well as application programs 708, such as a mobile location enabled application that can provide LBSs to a user.

The processor 702 can be coupled, either directly or via appropriate intermediary hardware, to a display 710 and to one or more input/output (I/O) devices 712, such as a keypad, a touch panel sensor, a microphone, and the like. Similarly, in some embodiments, the processor 702 can be coupled to a transceiver 714 that interfaces with an antenna 716. The transceiver 714 can be configured to both transmit and receive cellular network signals, wireless data signals, or other types of signals via the antenna 716, depending on the nature of the mobile device 700. Further, in some configurations, a GPS receiver 718 can also make use of the antenna 716 to receive GPS signals.

Modules, Components and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client or server computer system) or one or more processors can be configured by software e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor can be configured as respective different hardware-implemented modules at different times. Software can accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple such hardware-implemented modules exist contemporaneously, communications can be achieved through signal transmission (e.g., over appropriate circuits and buses) that connect the hardware-implemented modules. In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions. The modules referred to herein may, in some example embodiments, comprise processor-implemented modules.

Similarly, the methods described herein can be at least partially processor-implemented. For example, at least some of the operations of a method can be performed by one of processors or processor-implemented modules. The performance of certain of the operations can be distributed among the one or more processors, not only residing within a single machine, but deployed across a number of machines. In some example embodiments, the processor or processors can be located in a single location (e.g., within a home environment, an office environment or a server farm), while in other example embodiments the processors can be distributed across a number of locations.

The one or more processors can also operate to support performance of the relevant operations in a "cloud computing" environment or as a "software as a service" (SaaS). For example, at least some of the operations can be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments can be implemented in digital electronic circuitry, or in computer hardware, firmware, software, or combinations of these. Example embodiments can be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware e.g., a combination of software and a programmable processor), or in a combination of permanently and temporarily configured hardware can be a design choice. Below are set out hardware (e.g., machine) and software architectures that can be deployed, in various example embodiments.

Machine Architecture and Machine-Readable Medium

Figure 8:
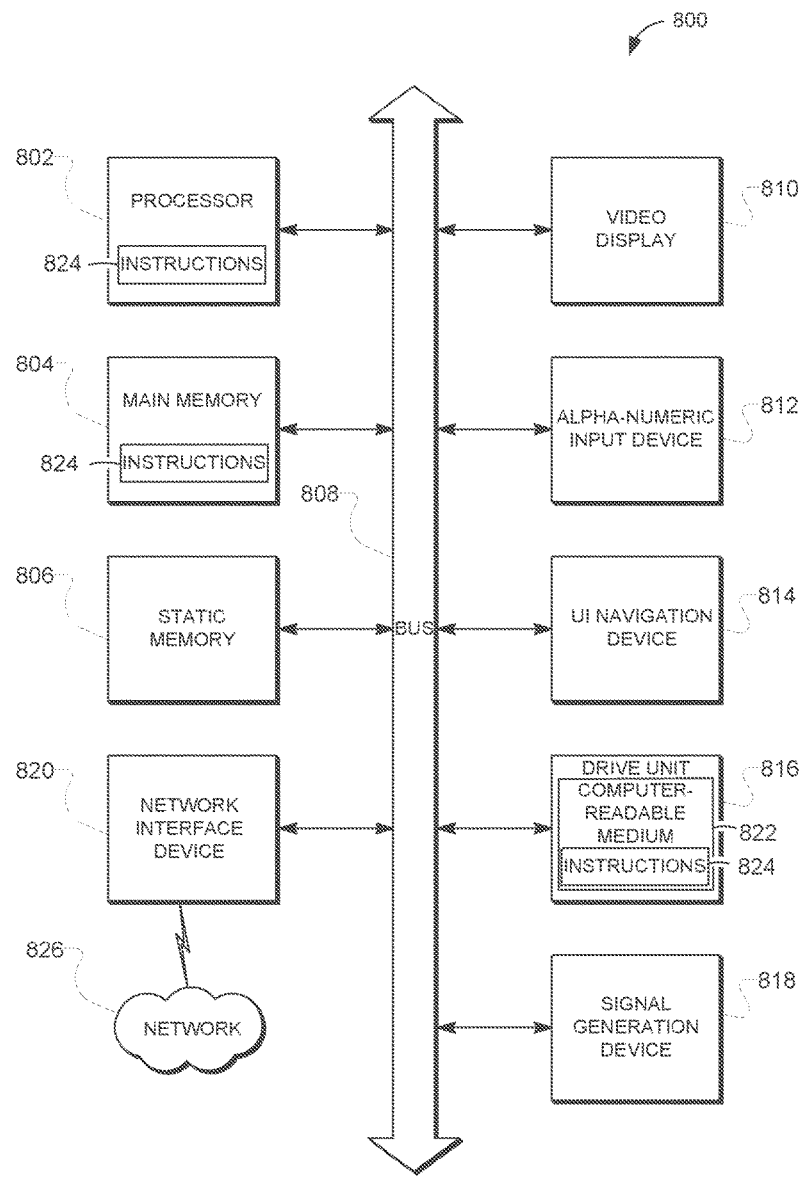
FIG. 8 is a block diagram of a machine in the example form of a computer system within which instructions for causing the machine to perform any one or more of the methodologies discussed herein can be executed.

FIG. 8 is a block diagram of a machine in the example form of a computer system 800 within which instructions for causing the machine to perform any one or more of the methodologies discussed herein can be executed. In alternative embodiments, the machine can operate as a stand-alone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a liquid crystal display (LCD) or a cathode ray tube (CRT)). The computer system 800 can also include an alpha-numeric input device 812 (e.g., a keyboard or a touch-sensitive display screen), a user interface (UI) navigation device 814 (e.g., a mouse), a drive unit 816, a signal generation device 818 (e.g., a speaker), and a network interface device 820.

Machine-Readable Medium

The disk drive unit 816 includes a computer-readable medium 822 on which is stored one or more sets of instructions and data structures (e.g., software) 824 embodying or utilized by any one or more of the methodologies or functions described herein. The instructions 824 can also reside, completely or at least partially, within the main memory 804 and/or within the processor 802 during execution thereof by the computer system 800, the main memory 804 and the processor 802 also constituting machine-readable media.

While the machine-readable medium 822 is shown in an example embodiment to be a single medium, the term "machine-readable medium" can include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 824 can further be transmitted or received over a communications network 826 using a transmission medium. The instructions 824 can be transmitted using the network interface device 820 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A system comprising:
   at least one hardware processor; and
   a memory comprising instructions which, when executed by the at least one hardware processor, cause the system to perform operations comprising:
      accessing a source image file including a header comprising a plurality of fields;
      receiving first and second edits to the source image file;
      identifying at least one field, of the plurality of fields, that is empty;
      editing the header by inserting information regarding the first and second edits into the at least one field that is empty, yielding an edited header; and
      transmitting the source image file, including the edited header, to a display device, wherein the display device, upon receiving the source image file, performs operations comprising:
         parsing the edited header to identify the information regarding the first and second edits;
         identifying first and second weights, associated with the first and second edits respectively, based on the information regarding the first and second edits;
         comparing the first and second weights, yielding a comparison;
         generating an edited image file by applying the first and second edits to the source image file in an order that is based on the comparison; and
         displaying the edited image file.

2. The system of claim 1, the operations further comprising:
   identifying at least one field, of the plurality of fields, that includes data that is not needed to display the source image; and
   editing the header by inserting information regarding the first and second edits into the at least one field that includes data that is not needed to display the source image.

3. The system of claim 1, wherein:
the first and second edits each comprises a selection of one of a plurality of editing tools or a selection of one of a plurality of editing filters;
each of the plurality of editing filters adjusts a qualitative artistic property of an image and each of the editing tools each provides an interface for a user to adjust a quantitative property of the image; and
the first and second weights correspond to respective weights assigned to a selected editing tool or to a selected editing filter.

4. The system of claim 3, wherein the respective weights assigned to a selected editing tool or to a selected editing filter are determined based on a comparison of a first image quality of the edited image with a first editing tool or editing filter applied before a second editing tool or editing filter against a second image quality of the edited image with the second editing tool or editing filter applied before the first editing tool or editing filter.

5. The system of claim 3, wherein the information regarding the first and second edits specifies a level for each selected editing tool or selected editing filter and the memory comprises instructions which, when executed by the processor, cause the display device to apply the first and second user edits in an order that is determined based on the respective weight assigned to each selected editing tool or editing filter and based on the level of each selected editing tool or editing filter.

6. The system of claim 1, wherein the source image file comprises a "JPEG" file and the header comprises "Exif" metadata.

7. A method comprising:
accessing a source image file including a header comprising a plurality of fields;
receive first and second edits to the source image file;
identifying at least one field, of the plurality of fields, that is empty;
editing the header by inserting information regarding the first and second edits into the at least one field that is empty, yielding an edited header; and
transmitting the source image file, including the edited header, to a display device, wherein the display device, upon receiving the source image file, performs operations comprising:
parsing the edited header to identify the information regarding the first and second edits;
identifying first and second weights, associated with the first and second edits respectively, based on the information regarding the first and second edits;
comparing the first and second weights, yielding a comparison;
generating an edited image file by applying the first and second edits to the source image file in an order that is based on the comparison; and
displaying the edited image file.

8. The method of claim 7, further comprising:
identifying at least one field, of the plurality of fields, that includes data that is not needed to display the source image; and
editing the header by inserting information regarding the first and second edits into the at least one field that includes data that is not needed to display the source image.

9. The method of claim 7, wherein:
the first and second edits each comprises a selection of one of a plurality of editing tools or a selection of one of a plurality of editing filters;
each of the plurality of editing filters adjusts a qualitative artistic property of an image and each of the editing tools each provides an interface for a user to adjust a quantitative property of the image; and
the first and second weights correspond to respective weights assigned to a selected editing tool or to a selected editing filter.

10. The method of claim 9, wherein the respective weights assigned to a selected editing tool or to a selected editing filter are determined based on a comparison of a first image quality of the edited image with a first editing tool or editing filter applied before a second editing tool or editing filter against a second image quality of the edited image with the second editing tool or editing filter applied before the first editing tool or editing filter.

11. The method of claim 9, wherein the information regarding the first and second edits specifies a level for each selected editing tool or selected editing filter and the memory comprises instructions which, when executed by the processor, cause the display device to apply the first and second user edits in an order that is determined based on the respective weight assigned to each selected editing tool or editing filter and based on the level of each selected editing tool or editing filter.

12. The method of claim 7, wherein the source image file comprises a "JPEG" file and the header comprises "Exif" metadata.

13. A non-transitory machine-readable storage medium storing instructions which, when executed by at least one processor of a machine, cause the machine to perform operations comprising:
accessing a source image file including a header comprising a plurality of fields;
receive first and second edits to the source image file;
identifying at least one field, of the plurality of fields, that is empty;
editing the header by inserting information regarding the first and second edits into the at least one field that is empty, yielding an edited header; and
transmitting the source image file, including the edited header, to a display device, wherein the display device, upon receiving the source image file, performs operations comprising:
parsing the edited header to identify the information regarding the first and second edits;
identifying first and second weights, associated with the first and second edits respectively, based on the information regarding the first and second edits;
comparing the first and second weights, yielding a comparison;
generating an edited image file by applying the first and second edits to the source image file in an order that is based on the comparison; and
displaying the edited image file.

14. The storage medium of claim 13, the operations further comprising:
identifying at least one field, of the plurality of fields, that includes data that is not needed to display the source image; and
editing the header by inserting information regarding the first and second edits into the at least one field that includes data that is not needed to display the source image.

15. The storage medium of claim 13, wherein:
the first and second edits each comprises a selection of one of a plurality of editing tools or a selection of one of a plurality of editing filters;

each of the plurality of editing filters adjusts a qualitative artistic property of an image and each of the editing tools each provides an interface for a user to adjust a quantitative property of the image; and the first and second weights correspond to respective weights assigned to a selected editing tool or to a selected editing filter.

16. The storage medium of claim 15, wherein the respective weights assigned to a selected editing tool or to a selected editing filter are determined based on a comparison of a first image quality of the edited image with a first editing tool or editing filter applied before a second editing tool or editing filter against a second image quality of the edited image with the second editing tool or editing filter applied before the first editing tool or editing filter.

17. The storage medium of claim 15, wherein the information regarding the first and second edits specifies a level for each selected editing tool or selected editing filter and the memory comprises instructions which, when executed by the processor, cause the display device to apply the first and second user edits in an order that is determined based on the respective weight assigned to each selected editing tool or editing filter and based on the level of each selected editing tool or editing filter.

\* \* \* \* \*